J. T. DUFFY.
METHOD OF CONDENSING A VAPOR IN A NATURAL GAS.
APPLICATION FILED MAY 27, 1918. RENEWED MAY 6, 1920.
1,356,196. Patented Oct. 19, 1920.
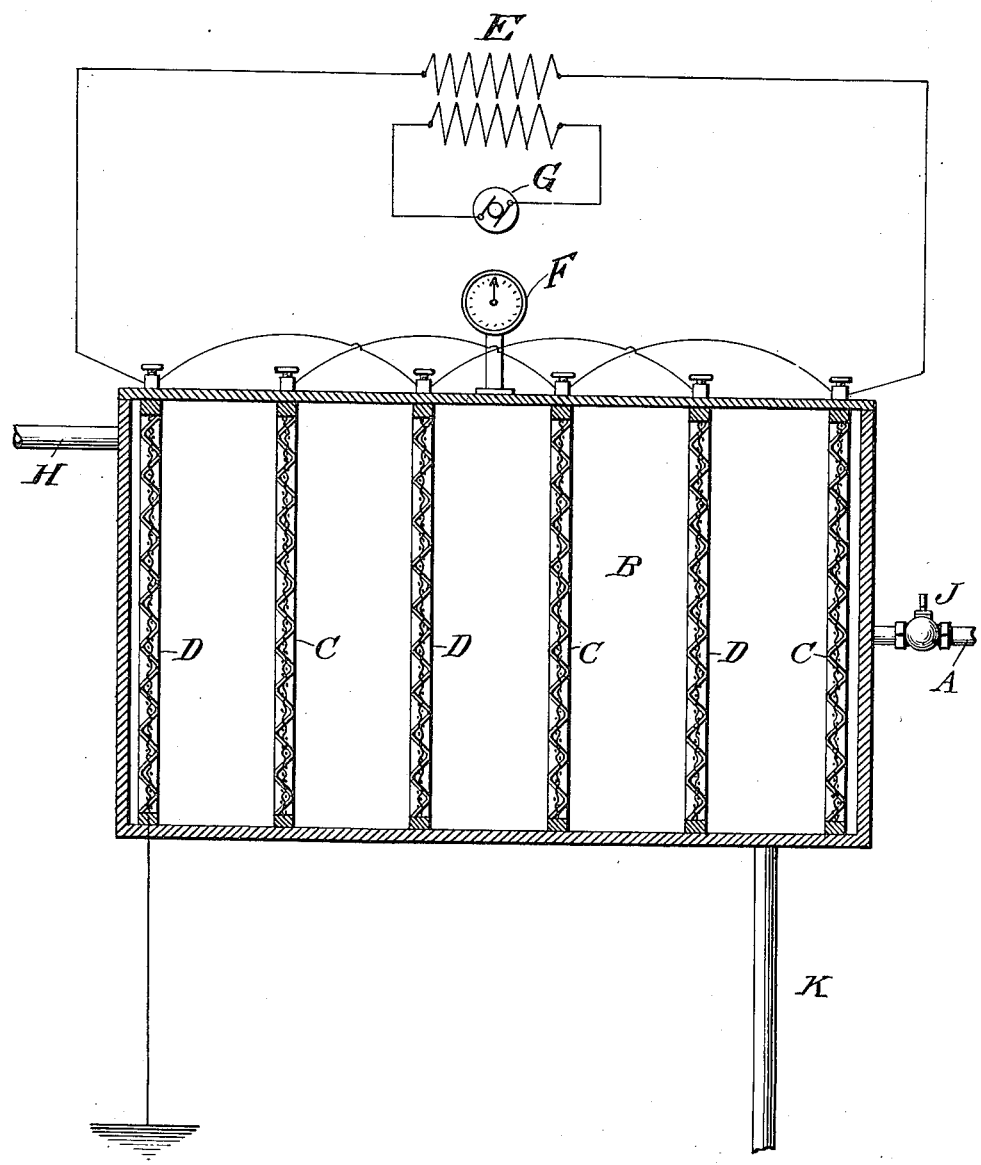
INVENTOR,
James T. Duffy,
BY
Henry P. Bright
ATTORNEY.

UNITED STATES PATENT OFFICE.

JAMES T. DUFFY, OF SAN ANTONIO, TEXAS.

METHOD OF CONDENSING A VAPOR IN A NATURAL GAS.

1,356,196. Specification of Letters Patent. Patented Oct. 19, 1920.

Application filed May 27, 1918, Serial No. 236,865. Renewed May 6, 1920. Serial No. 379,398.

*To all whom it may concern:*

Be it known that I, JAMES T. DUFFY, a citizen of the United States, residing at San Antonio, in the county of Bexar, State of Texas, have invented certain new and useful Improvements in Methods of Condensing a Vapor in a Natural Gas; and I hereby declare the following to be a full, clear, and exact description of the invention, such as will enable others skilled in the art to which it appertains to make and use the same.

My invention is particularly intended for use in the condensation and removal of the light hydrocarbons from natural gas sometimes known as wet gases delivered from oil wells or such vapors as may be mechanically produced from heavy hydrocarbons. Heretofore, such results have been achieved by high pressures in connection with refrigeration by open expansion or a system of mechanical refrigeration. In the former methods, large quantities of liquid hydrocarbons have been produced by high pressures and low temperatures, which, when exposed to the atmosphere have evaporated rapidly, carrying with it much of the more stable liquid, commonly known as gasolene.

The word "vapor" where heretofore or hereinafter used shall be construed to mean a portion of a gas which may be condensed or separated into a liquid form.

My invention is based on the theory that the dust in the atmosphere acts as a nucleus on which moisture may condense under certain conditions of sudden lowering of the temperature, such as the production of dew caused by the earth cooling off more rapidly than the atmosphere next to it.

Heretofore electrical brush discharges have been used to precipitate a cloud of moisture mostly formed of aqueous solutions while contained in hot gases, also the agglomeration of moist substances. These suspensions are more or less stable in character and are easily combined or dragged out by the discharge. The condensation of hydrocarbon vapors require low temperatures, and a medium with which the very small condensations may combine and prevent evaporation, as the condensations in themselves have very high vapor pressures, and are by nature, a gas at comparatively low temperatures.

In my invention, I substitute, for two stage pressures of 250 pounds, which are now used to force a supersaturation, nuclei by introducing into the vapor a brush discharge of alternating polarity around which condensation is readily brought about at a temperature which is much higher than that which will clean the vapors of condensable moisture in connection with high pressures. In all dustless vapors, the condensations are very small and have a high vapor pressure and will again evaporate. However the brush discharges acting as a nuclei around which to condense, and the nature of the ions to combine quickly, cause the formation of larger drops with less vapor pressure and of a more stable nature.

My invention will be best understood by referring to the accompanying drawing, which is a diagrammatic representation of a form of apparatus which may be employed in carrying my invention into effect.

Referring to the drawing, A indicates a gas way leading from the source of gas supply through which the gas to be treated passes into a chamber B preferably constructed of a non-conducting material.

For an arrangement of electrodes, equal distance from each other, a number of cross members C of suitable material, preferably copper screen are suitably secured and insulated from each other. To each of these members is secured a moisture proof filament of non-conducting material, asbestos or cotton adapted to facilitate a brush or silent discharge. Each of the electrodes C is properly wired to one of the terminals of a secondary coil of a step up transformer E— the other terminal of which is connected to the opposite electrodes D which are grounded. The primary coil of the transformer E receives current from an alternating current generator G.

The coils of the transformer E are so proportioned and a current of such potential is delivered from the generator G that a high difference of potential exists between the electrodes C and D and an alternating brush discharge is produced from the points of the electrodes.

The gas while being cooled enters the electrical field between the electrodes C and D and is ionized. As the temperature becomes lower a very fine condensation is assisted by the nucleus and by combination of the ions larger drops are formed and carried out or precipitated by the action of the brush discharge and is removed from the chamber B through the pipe K.

A valve J in pipe A situated just outside of the chamber properly adjusted regulates the degree of expansion to the amount of gas passing through the apparatus. The method of refrigeration is not confined to mechanical expansion, but may be carried on by other equipment in connection with the nucleus produced by the electrical discharge.

The construction of apparatus is not limited to the drawing shown, but may be designed singly or in series to meet the requirement of the particular vapor to be treated. The apparatus may also be constructed of different materials and designs using electrodes of a design best adapted to the construction. In the construction and operation proper regard must be had for the size of the electrodes and the volume of gas passing through the chamber.

I claim:

1. An improvement in the method of condensing a vapor contained in a natural gas consisting in passing a brush discharge of alternating polarity through the gas, while the temperature is being lowered thereby producing in said gas a nucleus around which the vapor will condense.

2. An improvement in the method of condensing a vapor contained in a natural gas consisting in passing a brush discharge of alternating polarity through the gas, while the temperature is being lowered, thereby producing in said gas a nucleus around which condensation of the vapor is brought about without the use of high pressures.

3. An improvement in the method of condensing vapor contained in a natural gas consisting in passing a brush discharge of alternating polarity through the gas, while the temperature is being lowered, thereby producing in said gas a nucleus around which a condensation of the vapor is brought about without the use of high pressures and at a temperature which would not produce condensation of the vapor in a dust free gas.

In testimony whereof I hereunto affix my signature in the presence of two witnesses.

JAMES T. DUFFY.

Witnesses:
LEONARD BROWN,
ELIZA LINZY.